E. G. SCHILLER.
TRAP NEST.
APPLICATION FILED MAY 15, 1914.

1,134,912.

Patented Apr. 6, 1915.

Witnesses
Hugh H. Ott
Wm. Dagger

Inventor
E. G. Schiller
By Victor J. Evans
Attorney

UNITED STATES PATENT OFFICE.

EDWIN G. SCHILLER, OF KOKOMO, INDIANA.

TRAP-NEST.

1,134,912.     Specification of Letters Patent.     Patented Apr. 6, 1915.

Application filed May 15, 1914. Serial No. 838,814.

*To all whom it may concern:*

Be it known that I, EDWIN G. SCHILLER, a citizen of the United States, residing at Kokomo, in the county of Howard and State of Indiana, have invented new and useful Improvements in Trap-Nests, of which the following is a specification.

This invention relates to trap nests which are so constructed that a hen entering to deposit an egg will be trapped until released by an attendant.

The invention has for its object to produce a trap nest of simple and improved construction, and having a door adapted to close by gravity and means for supporting the door in raised position.

A further object of the invention is to provide simple and improved trigger means for releasing the trap door by the action of the hen entering into the trap.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

Figure 1:
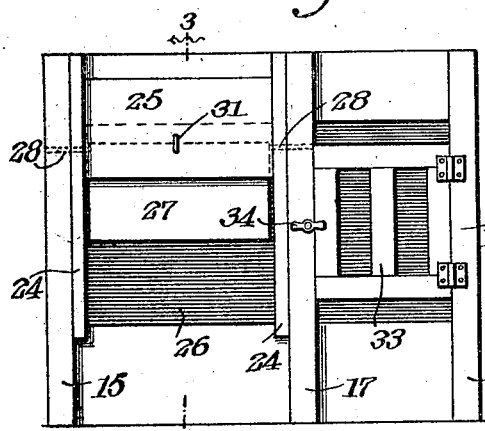
Figure 2:
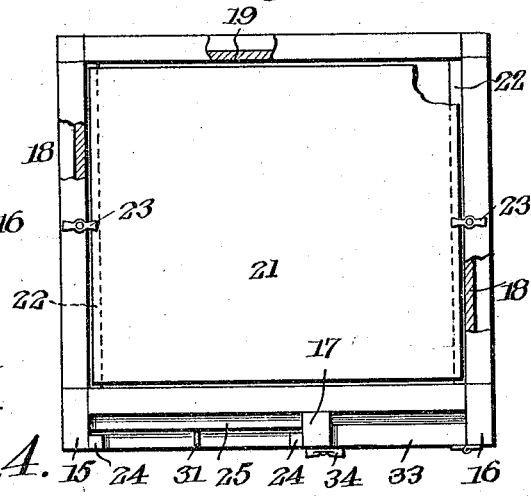
Figure 3:
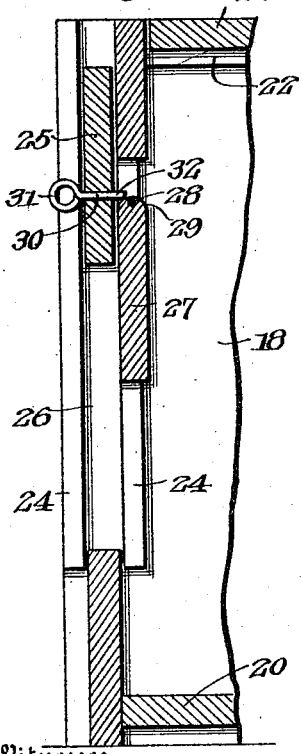
Figure 4:
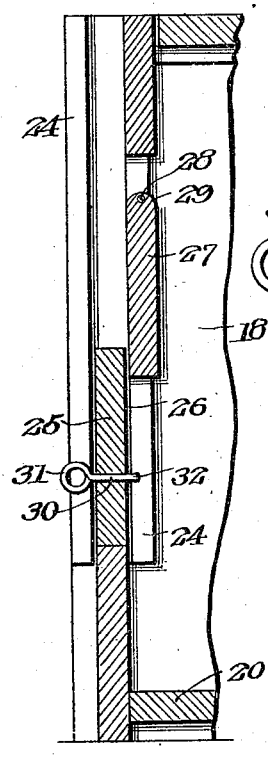
Figure 5:
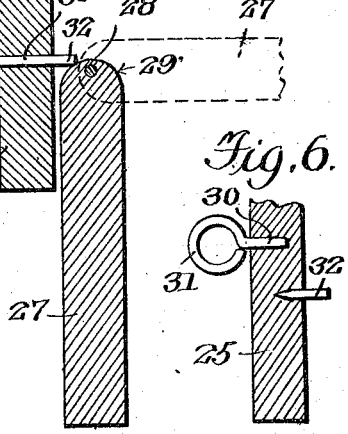
Figure 6:
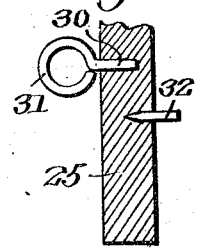

In the drawing, Figure 1 is a front elevation of a trap nest constructed in accordance with the invention and showing the trap door raised for the admission of the hen. Fig. 2 is a top plan view with parts broken away. Fig. 3 is a vertical sectional view taken on the line 3—3 in Fig. 1. Fig. 4 is a similar view showing the trap door closed. Fig. 5 is a sectional detail view showing a portion of the trap door in supported position with respect to the trigger door and with dotted lines showing the trigger door in a position that will permit the trap door to drop. Fig. 6 is a sectional detail view of a portion of the trap door illustrating a slight modification.

Corresponding parts in the several figures are denoted by like characters of reference.

A suitable box or casing is provided which in its construction includes front corner posts 15, 16, an intermediate front post 17, sides 18, a backing 19, a floor 20, and a removable lid or cover 21, the latter being supported on cleats 22 and secured detachably by turn buttons 23. The intermediate front post 17 and one of the corner posts 15 are provided on their inner faces with cleats 24 forming guides for a vertically slidable trap door 25, the front portion of the box having an entrance opening 26 adapted to be obstructed by said trap door. A trigger door 27 is swingingly mounted by pivot members 28 between the posts 15 and 17. The upper edge of the door is preferably, but not necessarily rounded, as shown at 29, and the pivot members which project from the side edges between the front and rear faces of the trigger door are placed closely adjacent to the extreme upper edge, the distance between the pivotal axis and the extreme upper edge of the door being less than the distance between the pivotal axis and the front and rear faces, as will be very clearly seen by reference to the enlarged view, Fig. 5. The trap door 25 is provided with a pin 30 extending therethrough and having at its outer end an eye 31 constituting a handle whereby the door may be manipulated. The inner end of the pin projects through the door so as to form a stud 32 which is adapted to rest on the upper edge of the trigger door, as clearly seen in Figs. 3 and 5. By reference to the dotted lines in Fig. 5, however, it will be readily seen that the trigger door may be swung from its normal approximately vertical position in the direction of a horizontal position. It follows that when the trigger door is thus swung, the upper edge portion thereof will gradually recede from the pin or stud 32 until sufficient clearance is afforded for the latter to permit the trap door to drop by gravity to the position shown in Fig. 4 when the entrance opening 26 will be obstructed. To restore the trap to its "set" position the trap door 25 may be lifted by the handle 31, the trigger door 27 being meanwhile pushed out of the path of the pin or stud 32 until the latter passes the trigger door, when the trigger door may be permitted to swing back to its normal position in which its upper edge will be engaged by the stud 32, thereby causing the trap door to be supported in a raised position. The trap door may be provided with a supporting stud 32' independently of the pin 30 having the handle 31, as indicated in Fig. 6. The front of the trap is provided with a door 33 situated between the posts 16 and 17 and adapted to be retained in closed position by a turn button 34, said door being for the convenient removal of the fowl from the trap.

The operation of this device and its advantages will be readily understood from the foregoing description taken in connection with the drawing. A hen on entering the trap will brush against the lower edge of the trigger door 27, swinging the latter inward and releasing the trap door, which latter will drop by gravity to an obstructing position. The hen will practically have entered the trap before the trap door is released, and she will, therefore, be safe from injury.

The construction is simple, inexpensive and thoroughly efficient for the purposes for which it is provided.

Having thus described the invention, what is claimed as new, is:—

1. In a device of the class described, a box having front door posts and an opening therebetween, a trigger door supported swingingly between the posts, a trap door guided for vertical sliding movement between the posts, and a stud projecting from the trap door to engage the upper edge of the swinging trigger door.

2. In a device of the class described, a box having front posts and an opening therebetween, a trigger door having pivot members engaging the posts, said pivot members being positioned to leave between the extreme upper edge of the trigger door and the pivotal axis a less distance than between said pivotal axis and the front and rear faces of the door, a trap door guided for vertical sliding movement between the posts, and a stud projecting from the trap door and adapted to engage the upper edge of the trigger door to support the trap door in a raised position.

3. In a device of the class described, a box constituting a nest and having front corner posts, an intermediate corner post, and an exit door between the intermediate post and one corner post, a trigger door supported swingingly between the other corner post and the intermediate post, the pivotal axis of said door being nearer the upper edge than the distance between said pivotal axis and the front and rear faces of the door, a trap door guided for vertical slidable movement between the posts that support the trigger door, and a pin extending through the trap door and having at its front end an eye constituting a handle, the rear end of said pin projecting to form a stud adapted to engage the upper edge of the trigger door.

In testimony whereof I affix my signature in presence of two witnesses.

EDWIN G. SCHILLER.

Witnesses:
 GEO. R. MOTE,
 E. R. ANDERSON.

Copies of this patent may be obtained for five cents each, by addressing the "Commissioner of Patents, Washington, D. C."